United States Patent [19]
Cox, Jr. et al.

[11] Patent Number: 5,160,690
[45] Date of Patent: Nov. 3, 1992

[54] PROCESS FOR USING A HIGH PRESSURE INJECTION MOLDING CYLINDER

[75] Inventors: Walter G. Cox, Jr., Salem; Schiao F. Chou, Blacksburg, both of Va.

[73] Assignee: Xaloy Incorporated, Va.

[21] Appl. No.: 793,017

[22] Filed: Nov. 15, 1991

[51] Int. Cl.⁵ .................. B29C 45/53; B29C 45/62
[52] U.S. Cl. ................................ 264/328.1; 249/135
[58] Field of Search ........... 264/328.1, 328.17, 328.19; 425/542; 249/135

[56] References Cited

U.S. PATENT DOCUMENTS

| | | | |
|---|---|---|---|
| 3,653,982 | 4/1972 | Prill | 75/236 |
| 3,754,846 | 8/1973 | Choate | 425/577 |
| 4,171,233 | 10/1979 | Vander Voort | 148/330 |
| 4,863,661 | 9/1989 | Maddy | 249/135 |
| 5,073,313 | 12/1991 | Umemura et al. | 264/328.1 |

Primary Examiner—Jill L. Heitbrink
Attorney, Agent, or Firm—Ostrolenk, Faber, Gerb & Soffen

[57] ABSTRACT

An iron-based inlay alloy composition for high pressure injection molding of plastics. The composition includes carbon, chromium, molybdenum, tungsten and vanadium, and may be used as an inlay for bimetallic cylinders for injection molding plastic at pressures above 40,000 psi.

5 Claims, No Drawings

PROCESS FOR USING A HIGH PRESSURE INJECTION MOLDING CYLINDER

BACKGROUND OF THE INVENTION

1. Field of the Invention

The present invention relates to injection molding of plastic resins at very high injection pressures and, more particularly, a bimetallic cylinder capable of withstanding injection pressures in excess of 40,000 psi in injection molding processes for producing plastic articles.

2. Description of the Related Art

In the past five years, the plastics industry has seen a marked increase in the use of engineering grade resins that require processing pressures above 40,000 psi. Conventional bimetallic cylinders designed to provide wear resistance have the shortcoming of not being able to withstand injection pressures above 25,000 psi without the addition of a high pressure, heat treated sleeve shrunk fit on the output end of the barrel While this fix works in most cases up to 30,000-35,000 psi, there is a limit to the pressure these types of barrels can withstand. Conventional barrels will fail at internal injection pressures of around 42,000 psi. In an injection process, the maximum operational pressure is much lower because the process necessitates a safety factor of 1.5. In contrast, the barrel of the present invention did not crack at a pressure of 119,000 psi (limit of testing equipment). Thus, this invention can provide bimetallic cylinders that have the required abrasive wear resistance while providing the capability of sustaining high internal injection pressures. The resultant internal hoop stress levels caused by these high injection pressures can be tolerated with a safety factor of 1.5 minimum and without the need for a high pressure sleeve. It is desirable to eliminate high pressure sleeves not only from a cost point of view, but also due to the fact that plastic can be forced between the high pressure sleeve and the barrel outer diameter which can cause the barrel to crack or to collapse and seize the screw.

OBJECTS OF THE INVENTION

An object of the invention is to provide a bimetallic cylinder that can withstand pressures above 40,000 psi without the need for a high pressure sleeve.

A further object of the invention is to provide a bimetallic cylinder alloy inlay that can be post heat treated to impart high strength properties to the cylinder.

A further object of the invention is to provide a process incorporating hot isostatic processing (HIPping), as will be described below, to bond the alloy of the invention to the backing steel of the cylinder.

Another object of the invention is to provide a post heat treatable barrel that can be manufactured to exact tolerance levels with the ability to carry high pressures.

SUMMARY OF THE INVENTION

The foregoing and other objectives are achieved by providing an alloy inlay composition comprising the following ingredients in about the proportions set forth below:

| Ingredient | Weight Percent |
|---|---|
| Carbon | 1.0-2.0 |
| Chromium | 3.0-7.5 |
| Molybdenum | 2.0-8.0 |
| Tungsten | 2.0-8.0 |
| Vanadium | 2.5-6.5 |
| Nickel | 0.0-5.0 |
| Silicon | 0.0-0.6 |
| Manganese | 0.0-1.0 |
| Copper | 0.0-5.0 |
| Cobalt | 0.0-7.0 |
| Iron | balance |

Preferably, the inlay comprises the following ingredients in about the proportions set forth below:

| Ingredient | Weight Percent |
|---|---|
| Carbon | 1.3 |
| Chromium | 4.5 |
| Molybdenum | 5.0 |
| Tungsten | 5.7 |
| Vanadium | 4.2 |
| Manganese | 0.3 |
| Silicon | 0.3 |
| Iron | balance |

A cylinder is also provided for high pressure injection molding of plastics, the cylinder including a steel backing and the above alloy composition as a high pressure inlay. Preferably, the steel is AISI 4140 steel. However, various other steels such as AISI 6150 and 8620 can also be used. The cylinder bore surfacing alloy (inlay alloy) is consolidated and bonded to the bore of the steel cylinder by HIPping. A high pressure injection molding method for preparing plastic articles is also provided. The method includes high pressure (preferably at greater then 40,000 psi) injection molding of plastic using the cylinder described above.

DETAILED DESCRIPTION OF THE PREFERRED EMBODIMENTS

One way of manufacturing the high strength bimetallic cylinder of the invention is by a process known as HIPping, as described in U.S. Pat. No. 4,863,661, which is herein incorporated by reference. An alloy in the form of powder is consolidated and metallurgically bonded to the inner surface of a hollow steel cylinder by HIPping to form a hard and wear resistance inlay on the cylinder bore. Two methods to preplace the inlay alloy powder before HIPping are discussed below. Other methods will be apparent to one skilled in the art.

a. Compacting the powder by vibration

A thin-walled mandrel of plain carbon steel is made such that the O.D. (outside diameter) of the mandrel is smaller than the desired final I.D. (inside diameter) of the surfaced cylinder. The amount smaller will be sufficient to accommodate mandrel expansion during alloy powder consolidation upon HIPping plus the amount of finish stock desired on the bore surface. After the mandrel is well centered inside the cylinder, one end of the cylinder is sealed first by welding a thin annular steel disc to the mandrel and cylinder wall. The alloy powder with the composition described above is placed in the space between the mandrel and outside cylinder. A second thin annular disc is welded on the other end to seal the space containing the powdered alloy. One end seal contains an evacuation tube. The assembly is placed on a vibration table to vibrate and compact the alloy powder. The air is then evacuated from the space containing the powder, the tube pinch welded, and subsequently fusion welded to maintain the vacuum.

b. Powder spraying

There are various techniques, such as plasma spray, high velocity oxygen fuel spray, flame spray, etc., that can spray alloy powder on a metallic substrate. The sprayed layer is then consolidated and bonded to the substrate by HIPping. Again, a thin-walled mandrel of plain carbon steel is made such that the O.D. of the mandrel is slightly smaller than the desired final I.D. of the surfaced cylinder. The amount smaller will be sufficient to accommodate mandrel expansion during surface alloy consolidation upon HIPping plus the amount of finish stock desired on the bore surface.

The alloy inlay composition described above in powder form is applied to the O.D. of the mandrel by any a variety of methods which cause the powder to remain in place during subsequent steps. Preferably this is done by a flame spray or high velocity impact because these methods retain more of the fine particle size and unique microstructural features of the starting powder than do melt application processes such as plasma transferred arc.

The rough O.D. surface of the coated mandrel is precision machined or ground to a dimension which after HIPping will yield the desired thickness of surface alloy, including allowance for final bore finishing.

The shell, housing, backer or casing cylinder is machined in its I.D. just enough larger than the O.D. of the surfaced mandrel so that a sliding fit can be made. All surfaces are cleaned and the mandrel inserted into the outer piece.

A thin metal annular disc is welded at each end of the cylinder to the mandrel and the housing to seal the space containing the surfacing alloy. These end flanges are most readily welded onto the mandrel during mandrel fabrication. One end seal should contain an evacuation tube. The air is evacuated from the space containing the surfacing alloy, the tube pinch welded, and subsequently fusion welded to maintain the vacuum.

After the powdered alloy is preplaced and sealed, by either one of the above two methods, the assembly is placed in a pressure vessel and subjected to heating and pressure. The temperature, time and pressure are sufficient to move the mandrel radially outward, consolidating the powdered surfacing alloy and bonding it to the bore of the cylinder or housing; but the temperature and time are minimal to avoid melting the surfacing alloy, causing grain growth in the surfacing alloy, or causing excessive diffusion of shell or housing metal atoms into the inlay alloy.

The advantages of the second method, in particular for making multi-lobed cylinders, will be apparent. Instead of cutting and welding multiple bore-surfaced single cylinders, it is the mandrel which is fabricated, surfaced over its entirety, and precision fitted into the housing or shell. After sealing the ends and evacuating, the assembly is HIPped as described above. Because of partial densification of the surfacing powders and the precision fitting into the housing, movement during HIPping is minimal and high dimensional accuracy can be obtained. Finishing steps and costs are minimized. No gaps in the surface protection occur.

Within the above guidelines, there are numerous variances possible in each step of the process, some of which will now be discussed.

The mandrel is preferably a thin walled tube of mild steel because such can be readily deformed at low HIPping temperatures and is easily removed after HIPping by machining or acid dissolution. However, heavier walled mandrels may be required if the surfacing powders are applied by fusion processes such as weld overlay or plasma transferred arc. Mandrels of other metals may be used. Solid, rather than tubular, mandrels might be used if the bore shape is complex or extra rigidity is needed. It is possible to make irregular-shaped bores, for example, grooved bores, by incorporating the reverse shape on the mandrel. A further modification of this invention includes utilizing a solid mandrel, preplacing the surfacing powders thereon, inserting the surfaced mandrel into a much larger thin walled tube or envelope, filling the space between mandrel and can with metal powders, and HIPping to form both surfacing and housing simultaneously, by metal consolidation inward against the solid mandrel.

The placement of the inlay alloy powders upon the mandrel may be done by any one of several ways, as disclosed above. The most desirable methods use low temperature flame spray or high velocity impact, so as to minimize melting and microstructural change in the powder particles, thus retaining maximum properties in the final surface layer. However, powders may also be placed upon the mandrel by any other suitable method such as weld overlay, plasma transferred arc plasma spray, or even casting a liquid alloy around the mandrel while in a mold. The essential feature of the HIPping process is that consolidation of the inlay alloy powder and bonding to the backing substrate are accomplished without melting the alloy. As a result, the microstructure of the surfacing alloy has very fine grains and is very uniform; the segregation of alloying elements is minimum. Besides, the inlay alloy made by HIPping has much fewer defects than that made by the conventional centrifugal casting process. Overall, the inlay alloy made by HIPping is much stronger and more wear resistant than that made by the casting process.

After removal from the HIP vessel, the end seals and mandrel are removed by any suitable method, such as simple machining or acid dissolution. Final dimensions are attained by any suitable method, such as machining, grinding, or honing.

The cylinder with the inlay alloy is heat treated. The cylinder is hardened at about 2150° F., depending on the chemical composition of the surfacing alloy, and quenched to about room temperature. Then it is tempered three times at about 1000° F. This heat treatment produces a very hard surfacing inlay and strong backing steel.

The invention will be more fully understood by reference to the examples set forth below. Example 1 relates to a barrel produced in accordance with the invention. Example 2 relates to a conventional barrel. Unless otherwise specified, all percentages are by weight.

EXAMPLE 1

A bimetallic barrel of AISI 4140 backing steel having an inlay (surfacing alloy) of the following chemical composition was fabricated and pressure tested:

| | C | Mn | Si | Cr | V | W | Mo | Fe |
|---|---|---|---|---|---|---|---|---|
| Weight % | 1.35 | 0.30 | 0.30 | 4.00 | 4.00 | 5.75 | 4.50 | balance |

The size of the cylinder was 1.655"×4.955"×24". The powdered alloy of the above composition was preplaced and sealed between a carbon steel mandrel and a 4140 steel cylinder. The powder was compacted by vibration. The assembly was then evacuated and HIPped at 2100° F. for four hours. The cylinder was heat treated. It was hardened at 2125° F. for 60 minutes and then quenched to 100° F. by nitrogen in 30 minutes. Afterwards, the barrel was tempered at 1000° F. for two hours and then cooled to room temperature three times. The resulting cylinder had a uniform inlay metallurgically bonded to the 4140 backing steel. The hardnesses of the inlay and backing steel were RC60 and RC26, respectively. The following shows the hardness of the inlay at various temperatures:

|    | Room Temp. | 500° F. | 600° F. | 700° F. | 800° F. | 900° F. | 1000° F. |
|----|------------|---------|---------|---------|---------|---------|----------|
| RC | 60.5       | 58.0    | 57.1    | 55.2    | 54.8    | 53.5    | 52.9     |

The inlay alloy of this invention retains its hardness at high temperatures better than that of the most widely used standard bimetallic cylinder made by the conventional centrifugal casting process (shown in the next example). This inlay alloy is more wear resistant than that of the standard inlay alloy for injection and extrusion processes at high temperatures.

ASTM LFW-1 wear tests were conducted on inlay alloy samples cut from the cylinder. In these tests, a test block was loaded against a test ring, which rotated at 197 rounds per minute, to simulate the adhesive wear between screw and cylinder in injection and extrusion processes. The test block was cut from the cylinder and had the inlay alloy on the surface. The surface of the ring was overlaid with Colmonoy 56 alloy, which is a commonly used hardfacing alloy on screws. The composition of Colmonoy 56 is the following:

|          | C   | Cr   | B   | Si  | Fe  | Ni      |
|----------|-----|------|-----|-----|-----|---------|
| Weight % | 0.6 | 13.0 | 2.7 | 4.0 | 4.0 | balance |

The weight loss of the inlay alloy on the block was 0.21 mg, which is much less than that of a standard product shown in the next example.

The cylinder was honed and machined to the finish dimensions and pressure tested. When the cylinder was internally pressurized to 86,000 psi, the ID of this cylinder increased by 0.12%. At 119,000 psi the ID increased by 0.36%. The inlay (surfacing alloy) did not crack at 119,000 psi. This pressure was the limit of the test equipment. The pressure carrying capacity of the standard cylinder in the plastic industry is shown in the next example. The pressure carrying capacity of this invention is tremendously higher.

EXAMPLE 2

A bimetallic cylinder of 4140 backing steel having an alloy inlay of the following chemical composition was fabricated by the conventional centrifugal casting process and was pressure tested:

|          | C   | Mn  | Si   | Ni  | Cr  | B   | Fe      |
|----------|-----|-----|------|-----|-----|-----|---------|
| Weight % | 3.5 | 1.4 | 0.83 | 4.5 | 1.1 | 1.0 | balance |

This is a standard product currently most widely used in the plastic industry. The size of this cylinder was also 1.655"×4.955"×24". The following shows the hardness of the inlay at various temperatures:

|    | Room Temp. | 500° F. | 600° F. | 700° F. | 800° F. | 900° F. |
|----|------------|---------|---------|---------|---------|---------|
| RC | 60.8       | 61.0    | 56.7    | 54.2    | 51.0    | 48.0    |

ASTM LFW-1 wear test was also conducted. The weight loss on the standard test block having the above inlay alloy was 1.9 mg.

In the pressure test, the inlay of this cylinder cracked and the bore diameter increased by 0.2% when it was internally pressurized to 42,000 psi.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In an injection molding method for preparing plastic articles, the improvement comprising injection molding a plastic using a cylinder comprising a steel backing and an alloy inlay comprising the following ingredients in about the proportions set forth below:

| Ingredient | Weight Percent |
|------------|----------------|
| Carbon     | 1.0–2.0        |
| Chromium   | 3.0–7.5        |
| Molybdenum | 2.0–8.0        |
| Tungsten   | 2.0–8.0        |
| Vanadium   | 2.5–6.5        |
| Nickel     | 0.0–5.0        |
| Cobalt     | 0.0–7.0        |
| Silicon    | 0.0–0.6        |
| Manganese  | 0.0–1.0        |
| Copper     | 0.0–5.0        |
| Iron       | balance        |

2. The method of claim 1, wherein the inlay comprises the following ingredients in approximately the proportions set forth below:

| Ingredient | Weight Percent |
|------------|----------------|
| Carbon     | 1.3            |
| Chromium   | 4.5            |
| Molybdenum | 5.0            |
| Tungsten   | 5.7            |
| Vanadium   | 4.2            |
| Manganese  | 0.3            |
| Silicon    | 0.3            |
| Iron       | balance        |

3. The method of claim 1, wherein the steel backing is 4140 steel.

4. The method of claim 3, wherein the inlay comprises the following ingredients in about the proportions set forth below:

| Ingredient | Weight Percent |
|------------|----------------|
| Carbon     | 1.3            |
| Chromium   | 4.5            |
| Molybdenum | 5.0            |
| Tungsten   | 5.7            |
| Vanadium   | 4.2            |
| Manganese  | 0.3            |
| Silicon    | 0.3            |
| Iron       | balance        |

5. The method of claim 1, wherein the plastic is injection molded at a pressure above 40,000 psi.

* * * * *